United States Patent
Sanders (10) Patent No.: US 11,172,651 B1
(45) Date of Patent: Nov. 16, 2021

(54) TWO-LEASH PET RESTRAINT

(71) Applicant: Graham Roger Sanders, Palos Verdes Estates, CA (US)

(72) Inventor: Graham Roger Sanders, Palos Verdes Estates, CA (US)

(*) Notice: Subject to any disclaimer, the term of this patent is extended or adjusted under 35 U.S.C. 154(b) by 0 days.

(21) Appl. No.: 16/780,865

(22) Filed: Feb. 3, 2020

Related U.S. Application Data (60) Provisional application No. 62/800,402, filed on Feb. 1, 2019.

(51) Int. Cl.
*A01K 27/00* (2006.01)

(52) U.S. Cl.
CPC .................. *A01K 27/003* (2013.01)

(58) Field of Classification Search
CPC .... A01K 27/003; A01K 27/004; A01K 27/00; A01K 27/005
See application file for complete search history.

(56) References Cited

U.S. PATENT DOCUMENTS

| | | | | |
|---|---|---|---|---|
| 794,563 A * | 7/1905 | Stahlknecht | ......... | A01K 27/005 119/776 |
| 937,800 A * | 10/1909 | Hazzard | ............... | A01K 27/005 119/776 |
| 2,833,249 A * | 5/1958 | Cornman | ............. | A01K 27/003 119/799 |
| 3,910,234 A * | 10/1975 | Henson | ................ | A01K 27/005 119/774 |
| 4,903,638 A * | 2/1990 | Lacey | .................. | A01K 27/005 119/776 |
| 5,129,363 A * | 7/1992 | Ricketts | ............... | A01K 27/004 119/799 |
| 6,053,129 A * | 4/2000 | Akre | .................... | A01K 27/005 119/795 |
| 6,230,663 B1 * | 5/2001 | Welch | .................. | A01K 27/005 119/772 |
| 8,360,011 B2 * | 1/2013 | Johnson | ................. | A01K 27/00 119/792 |
| 2011/0214620 A1 * | 9/2011 | Johnson | ................. | A01K 27/00 119/792 |
| 2020/0359603 A1 * | 11/2020 | Rhein | .................. | A01K 27/003 |

* cited by examiner

*Primary Examiner* — Kristen C Hayes
(74) *Attorney, Agent, or Firm* — Michael D. Eisenberg (57) ABSTRACT

A two-leash pet restraint comprises a main leash having a handle end and a collar connection end. The main leashing has a passageway oriented along a handle to collar connection end direction of a main leash. A command leash is partly disposed inside the main leash and is slidable within the main leash. The main leash has a command leash handle disposed outside the main leash toward the handle end and a part of the command leash is also disposed outside the main leash proximal to the collar connection end.

13 Claims, 7 Drawing Sheets

TWO-LEASH PET RESTRAINT

CROSS-REFERENCES TO RELATED APPLICATIONS

This application claims priority from U.S. Provisional Application Ser. No. 62/800,402 filed Feb. 1, 2019, which is hereby incorporated herein by reference in its entirety.

TECHNICAL FIELD

The present invention relates to a two leash restraint for household pets.

BACKGROUND OF THE INVENTION

Most of the current devices on the market for pet restraints attach at only one point and give more and more force at this one point until the dog responds or breaks free. Many of these devices are ineffective unless used with significant force and this can actually injure the dog. Those that do give input at different points are not designed to maximize the input to the dog with a minimum of input from the owner are not easily interchangeable for the owner and often do not make it so the dog is positioned at one's side when the device is activated. Many current dog leashes work best as restraints but they are not functional as communication. devices. The way most owners operate their leashes gives confusing messages to their pets and often leads to very poor responses from the dog when the leash is most needed, such as when other animals are present, getting out of the car, crossing busy streets and going through doorways. In most of these situations and many more the average dog will pull on his leash whether it is attached to a harness or not. Effectively trained dogs and old dogs may not, but these are the distinct minority. Most owners will struggle at least once with their dog on every walk or trip. This also makes walking pets dangerous for kids that are alone and elderly women.

The present invention helps eliminate this problem by allowing owners to communicate more precisely with their dog using a two-leash restraint, where the leash is separated into a command leash and a restraint leash. The present invention is a unique leash and training device in one. It gives completely unambiguous messages to the dog because it is gives two completely different inputs to your dog depending on which leash is activated. The command leash gives inputs around the rib cage and the main leash gives inputs through the collar. Dogs recognize and respond differently to the two different inputs and this helps owners stop almost any antisocial behavior. Each leash will work for both functions, but each is most effective at what it is designed to do. The leash changes from a restraint to a communication tool. It essentially communicates to the dog, "stop what you are doing and pay attention to me." It is the only two leash communication system developed for dogs. Although both leashes can work as a restraint, the command leash, when activated, is designed primarily to get a dog's attention with a minimal amount of input from the owner. The command leash is attached snuggly around the rib cage or upper abdomen. Dogs are very sensitive to input in these areas. The leash is designed to increase this sensitivity so dogs will respond faster with less input. It is a more effective way to communicate with the dog. The harder the dog pulls, the greater the stimulus from the command leash. Unlike many other solutions, this leash produces no physiological harm to a dog. It is very quick and easy to put on and off and it can be configured to remain on the animal without the user holding it. The two-leash restraint is currently designed to fit on any standard collar and also serves as a very effective training tool for.

BRIEF SUMMARY OF EMBODIMENTS OF THE INVENTION

According to one embodiment of the invention, a two-leash pet restraint comprises a main leash having a handle end and a collar connection end. The main leashing has a passageway oriented along a handle to collar connection end direction of a main leash. A command leash is partly disposed inside the main leash and is slidable within the main leash. The main leash has a command leash handle disposed outside the main leash toward the handle end and a part of the command leash is also disposed outside the main leash proximal to the collar connection end.

In a variant, the command leash has a smaller cross section than the main leash.

In another variant, the main leash further comprises an entrance hole leading to the passageway, disposed toward the handle end and an exit hole leading from the passageway disposed toward the collar connection end. The command leash enters the main leash through the entrance hole and exits the main leash through the exit hole.

In a further variant, the command leash is connected to the main leash via a releasable connection mechanism.

In yet another variant, the connection mechanism has a male end and a female end, wherein one end is attached to the main leash and the other end is attached to the command leash and wherein the male and female ends are configured for releasably connecting to each other for installation of the command leash around the body of a pet.

In still a further variant, the connection mechanism comprises a strip that connects to the main leash at the exit hole and covers the exit hole with a hole in the strip that aligns with the exit hole for passage of the command leash.

In a variant, the two-leash pet restraint further comprises a hollow first internal tube disposed inside the passageway of the main leash at the exit hole. The first internal tube has a cutout to permit passage of the command leash therethrough. The command leash is disposed through the first internal tube through an end of the first internal tube and a side of the first internal tube through a cutout in the first internal tube.

In another variant, a hollow second internal tube is disposed inside the passageway of the main leash at the entrance hole. The second internal tube has a hole to permit passage of the command leash therethrough. The command leash is disposed through the second internal tube through an end of the internal tube and a side of the second internal tube through a hole in the second internal tube.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
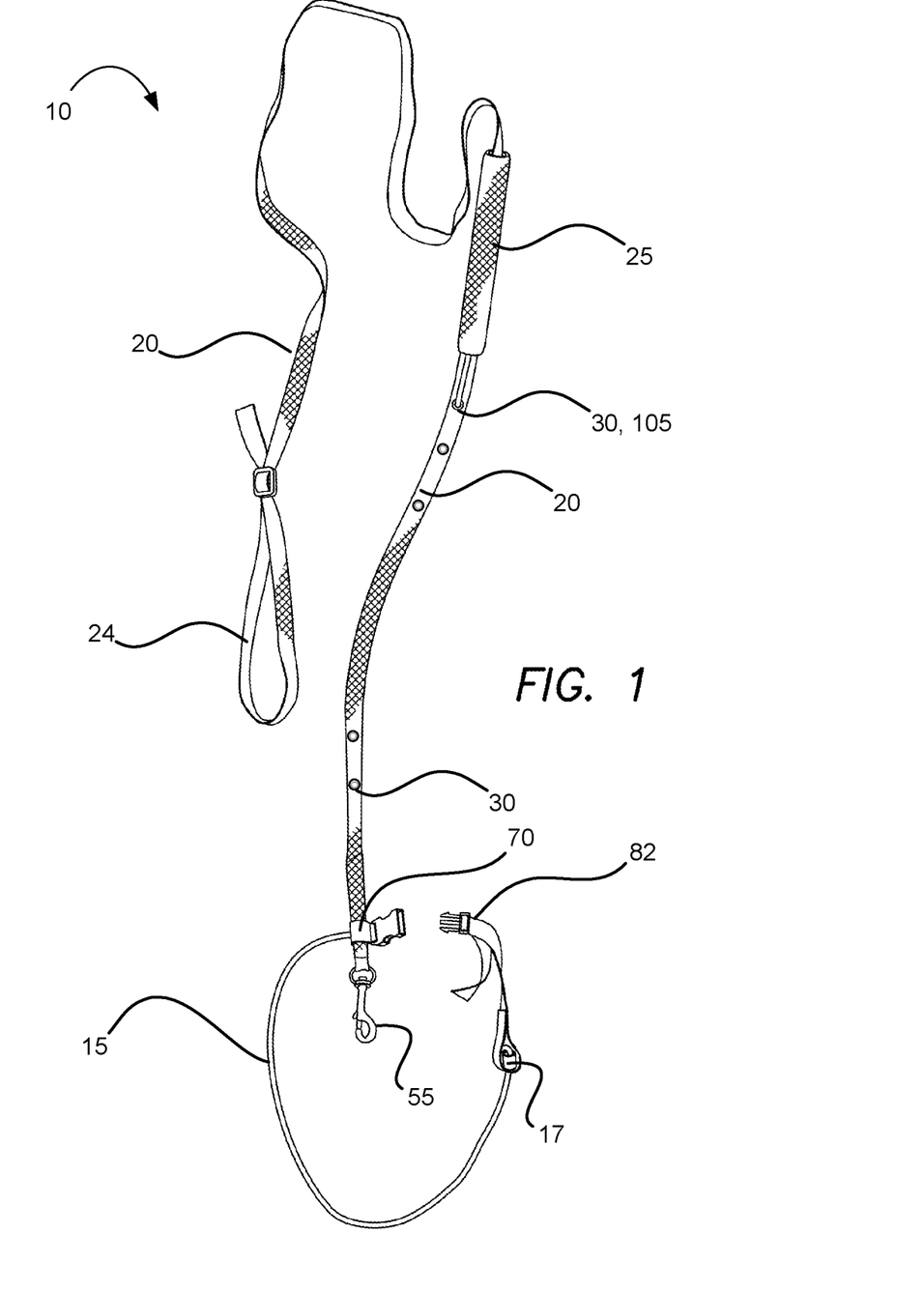
FIG. 1 is a plan view of a preferred embodiment of the two-leash pet restraint in accordance with the principles of the invention.
Figure 2:
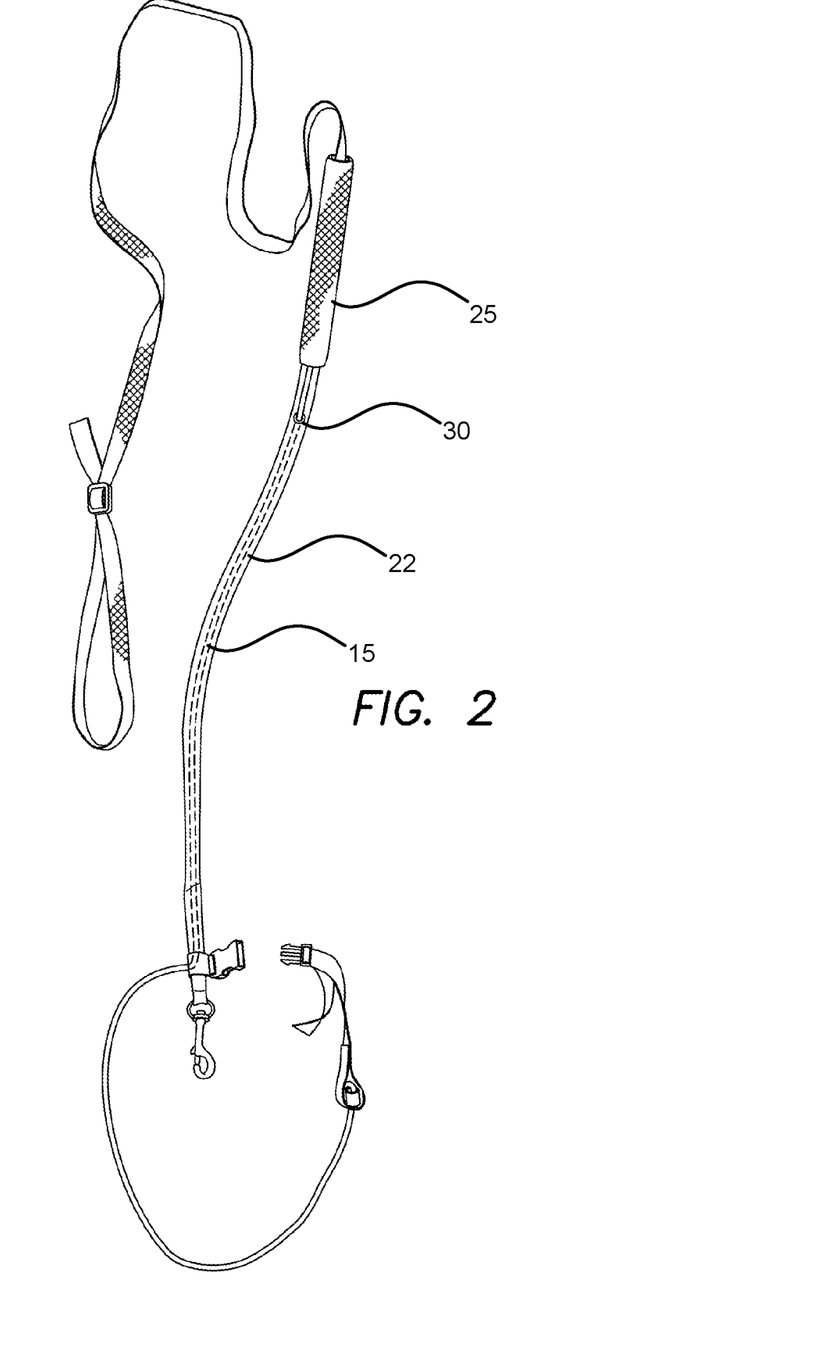
FIG. 2 is the plan view of FIG. 1, with then hidden lines shown as broken lines representing the command leash.

In a variant, referring to FIGS. 1-12, a two-leash restraint 10 (leash within a leash) for pets comprises a main leash 20, a command leash 15, a swivel bolt, a swivel bolt hook 55, and a first internal tube 40. The main leash 20 is comprised of tubular webbing, which provides for a passageway 22 containing a part of the command leash 15 and the first internal tube 40. The main leash 20 functions like a standard leash when the command leash is not activated (not being used by the user). The command leash 15 is partly disposed inside the main leash 20 and is disposed partly outside the main leash 20 and enters through an entrance hole 30 in the main leash 20 closer to a handle end 24 of the leash and exits through an exit hole 32 in the main leash 20 closer to the swivel bolt hook 55. The command leash 15 is slidable within the main leash 20. FIG. 2 illustrates the path of the command leash 15 inside the main leash 20 via the broken lines. The portion of the command leash 15 inside the main leash 20 is disposed in the passageway 22 which is aligned in a handle to collar connection end direction of a main leash 20. A plurality of entrance holes 30 are provided and various positions on the main leash 20 to permit optimal adjustment for better control for the owner. When the command leash is in use, the dog should be by the owner's side like the original guide dog harnesses. Different lengths of the command leash 15 can be configured by the user by utilizing the various entrance holes 30. The swivel bolt hook 55 is located at the collar connection end which is the terminal end of the main leash 20.

Figure 3:
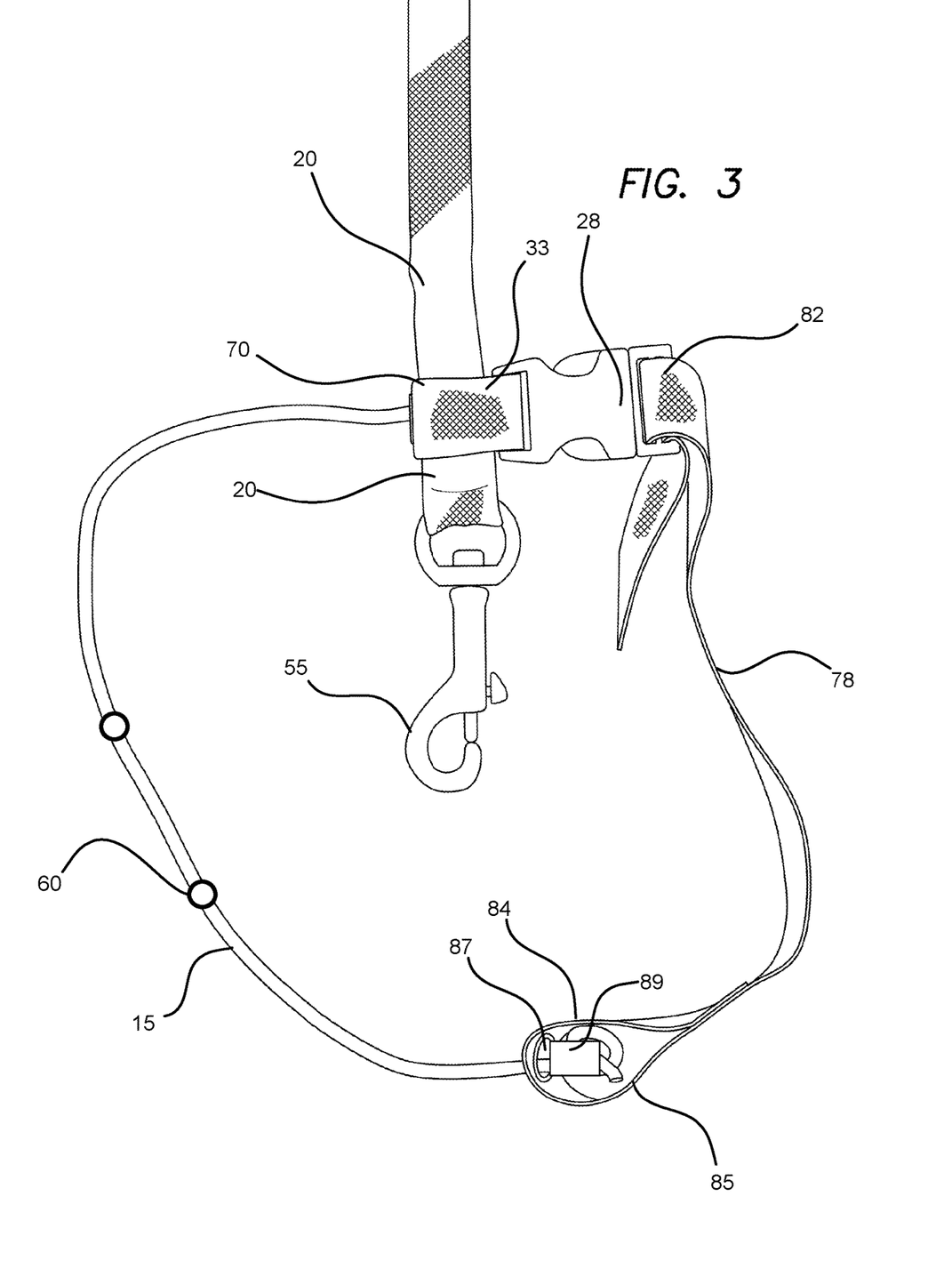
FIG. 3 is a detail view of the collar connection end of the two-leash pet restraint.
Figure 4:
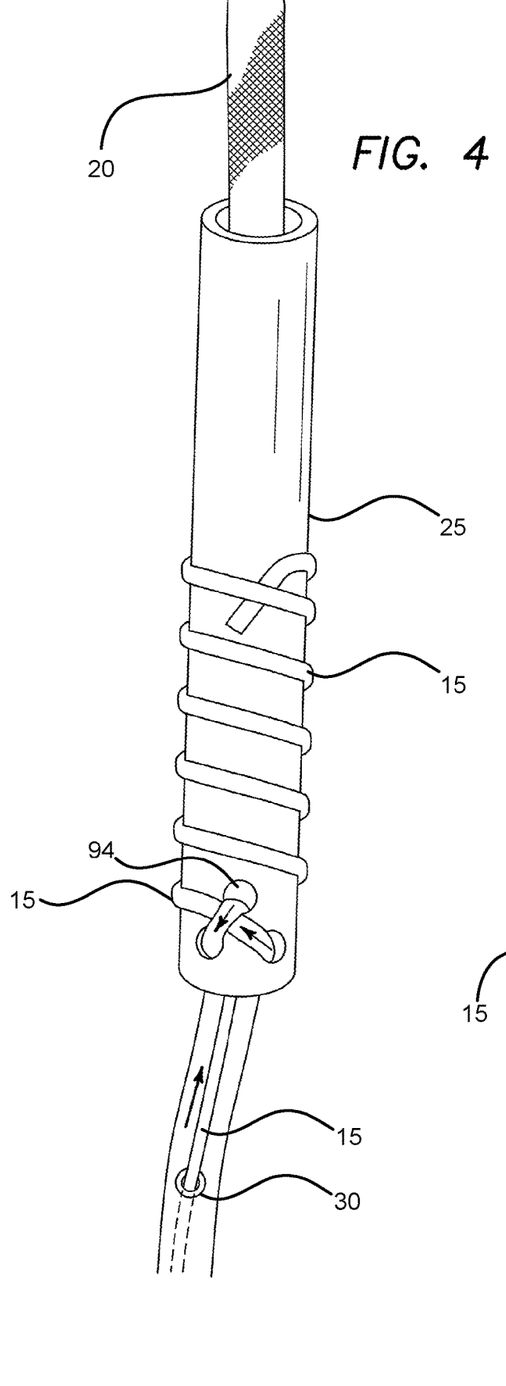
FIG. 4 is a detail view of the two-leash pet restraint illustrating the command leash handle with the cover removed.
Figure 5:
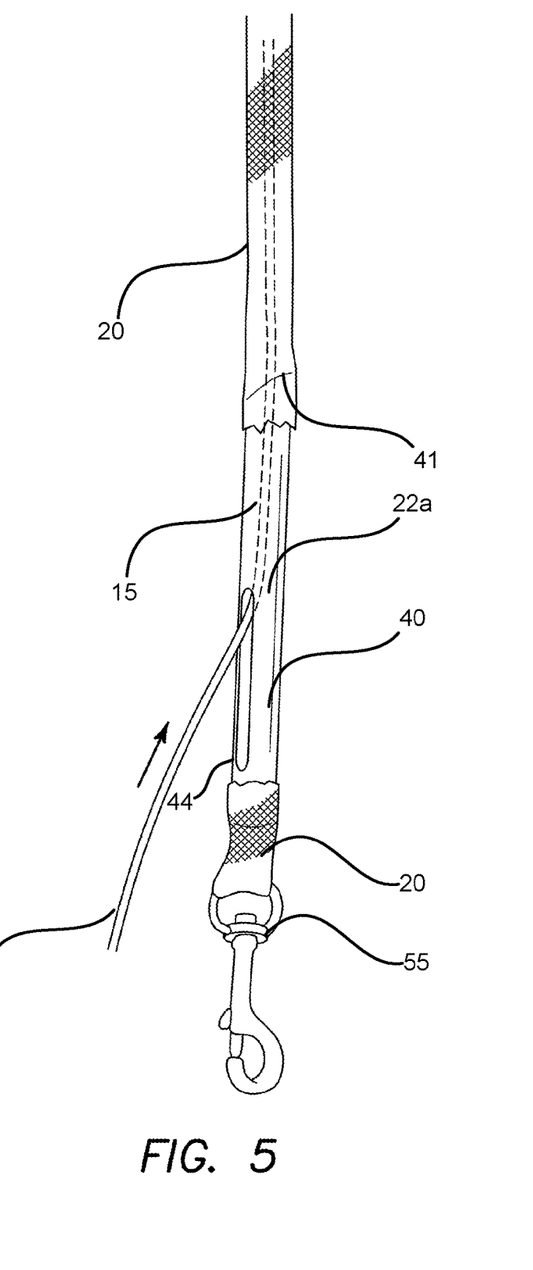
FIG. 5 is a detail view of the collar connection end with the part of the main leash removed for illustration purposes.

In an optional variant, referring to FIG. 3, spectra line beads 60 are provided on the command leash 15 and are configured to wrap around a dog's body. In an optional variant, the command leash 15 has a spectra line cord lock 17 for adjusting the length of the command leash 15.

Figure 6:
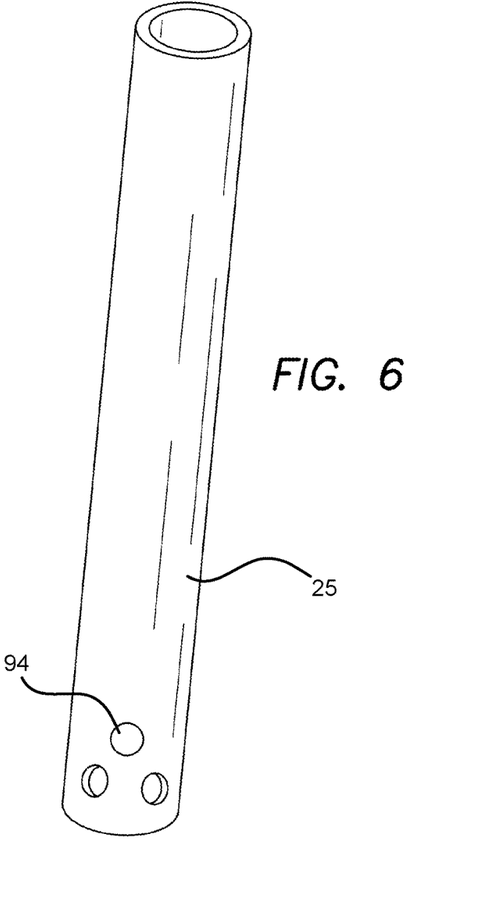
FIG. 6 is a perspective view of the command leash handle.
Figure 7:
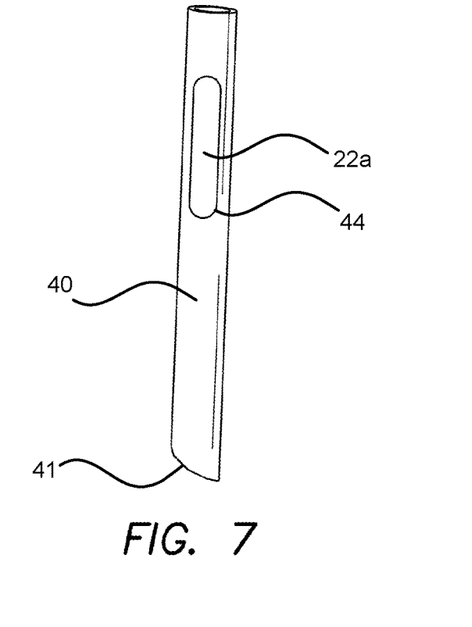
FIG. 7 is a perspective view of the first internal tube.
Figure 8:
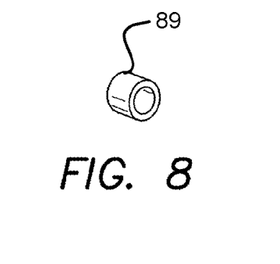
FIG. 8 is a perspective view of the cylinder.

Referring to FIGS. 1-12, the two-leash restraint 10 has a connection mechanism 28 which may optionally be a side release contour buckle 28, and a command leash handle 25 (FIG. 6). A male or female part of the contour buckle 28 is connected to the main leash 20 via a strip 33 of nylon material folded and joined at its opposite sides to form a loop 70. The loop 70 is joined to the main leash 20 around the portion that contains the first internal tube 40. A hole in the strip 70 is aligned over the exit hole 32, which in turn is aligned over a cutout 44 in the first internal tube 40, and a grommet secures together and protects the hole and exit hole 32. In an optional variant, the strip 70 is connected to the main leash 20 downstream or upstream of the exit hole 32 over the first internal tube 40 and does not have a hole. Optionally, the strip 70 is connected on the main leash 20 even further downstream or upstream of the first internal tube 40. The other side of the side release contour buckle 28, which is configured to connect and lock with the complimentary male or female side of the buckle 28 connected to the strip 33, is connected to a second strip 78 at a first end 82. Preferably, the second strip may be formed of an elastic material. Optionally, standard, non-stretchable leash material, such as nylon, may be disposed between connection mechanism 28 and command leash 15 to form part of the loop around the dog's body. A second end 84 of the second strip 78 is connected to the command leash 15. The second end 84 comprises a loop 85 formed by the second strip 78. The loop 85 has a hole 87 protected by a grommet. The command leash 15 is anchored to a loop 85 via being thread through a small cylinder 89 (FIGS. 3, 8 and 10) disposed inside the loop 85. The cord is twisted around itself which acts as a self-locking knot that is easily released when the owner wants to replace or adjust cord. The command leash may be knotted at its end to prevent passage out of the cylinder 89 or may be tied around the cylinder 89 as preferred.

The first internal tube 40, which is generally hollow and cylindrical as tubes typically are, is imbedded inside the main leash 20 in the passageway 22, with an angled end 41 pointed toward the handle end of the main leash 20, may be formed of plastic, aluminum tube, pex pipe or another suitable material (FIG. 7) and has a cutout 44 in its side formed from a removed portion, that leads to a passageway 22*a* inside the first internal tube 40 tube. The cutout 44 permits passage of the command leash 15 into the first internal tube 40 by entering the angled end 41 of the first internal tube 40 and exiting though the side through the cutout 44. The passageway 22*a* leads to the passageway 22 of the main leash 20. The first internal tube 40, being inside the main leash 20, provides stiffness and structure for a part of connection mechanism 28 to connect to the end of the main leash 20. Another end of the connection mechanism 28, which as illustrated is a male or female side of release contour buckle 28, is connected to an end of the command leash 15 that when both parts of the mechanism are attached, allows the command leash 15 to form a retractable loop around the dog's body (FIG. 11), while hook 55 is connected to a standard dog collar (not shown). Optionally, reflective tape is sown onto parts of the tubular webbing. The command leash handle 25 may be formed from plastic, and be comprised of a pex pipe. The command leash 15 optionally has a double handle for more than one user.

Figure 9:
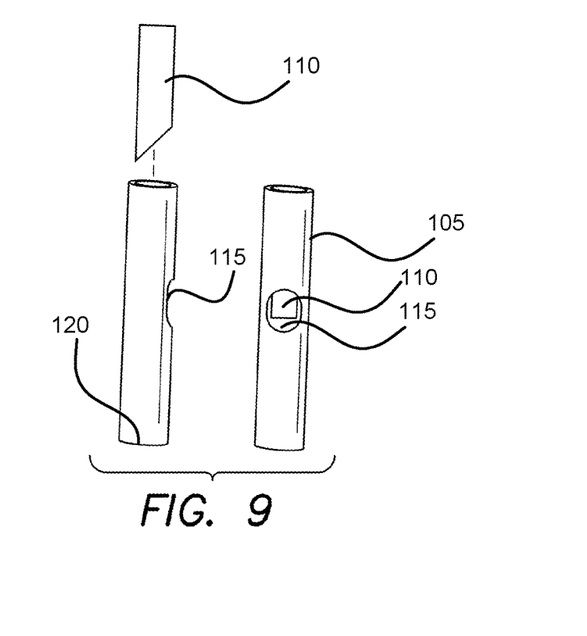
FIG. 9 are perspective views of the second internal tube with the metal wedge exploded away and inserted in the tube.
Figure 10:
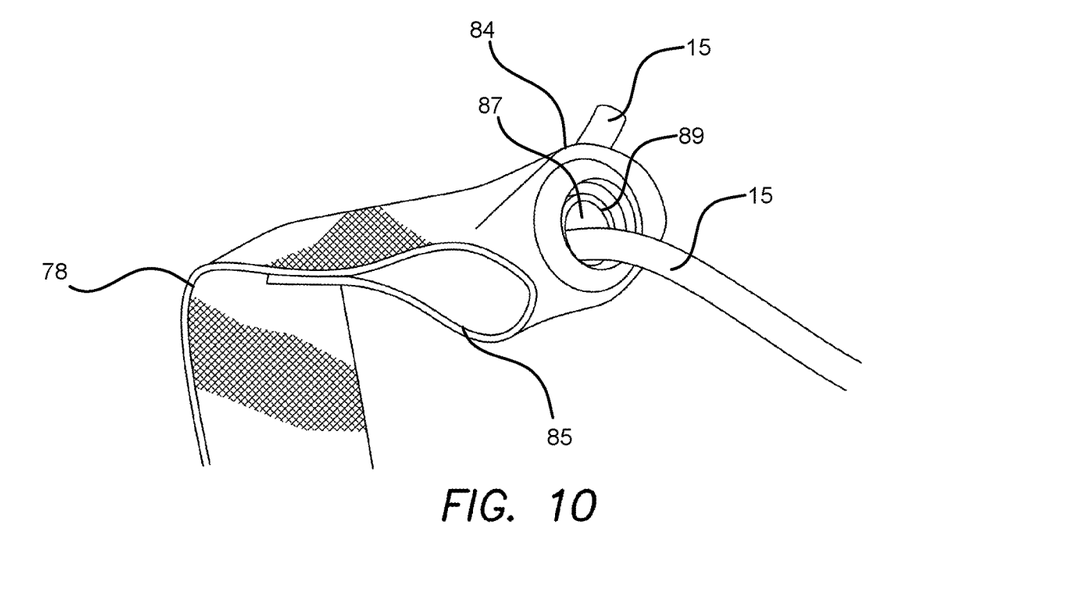
FIG. 10 is a detail view of the command leash to strip connection.
Figure 11:
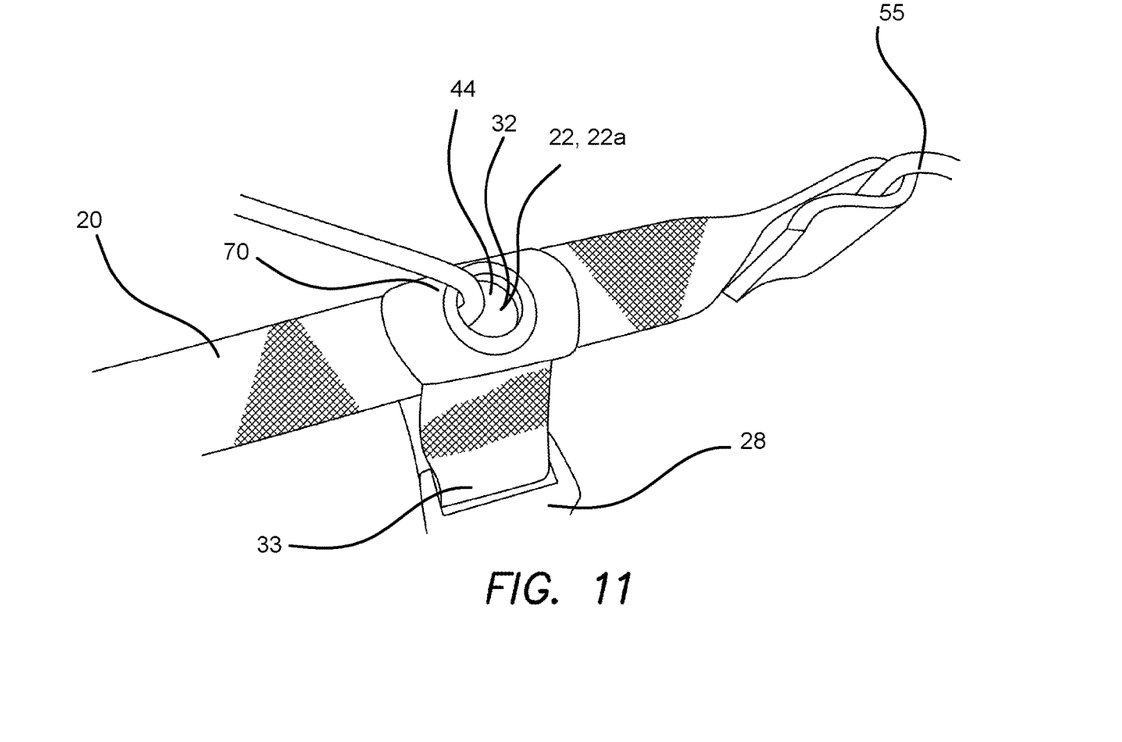
FIG. 11 is a detail view of the strip to main leash connection.
Figure 12:
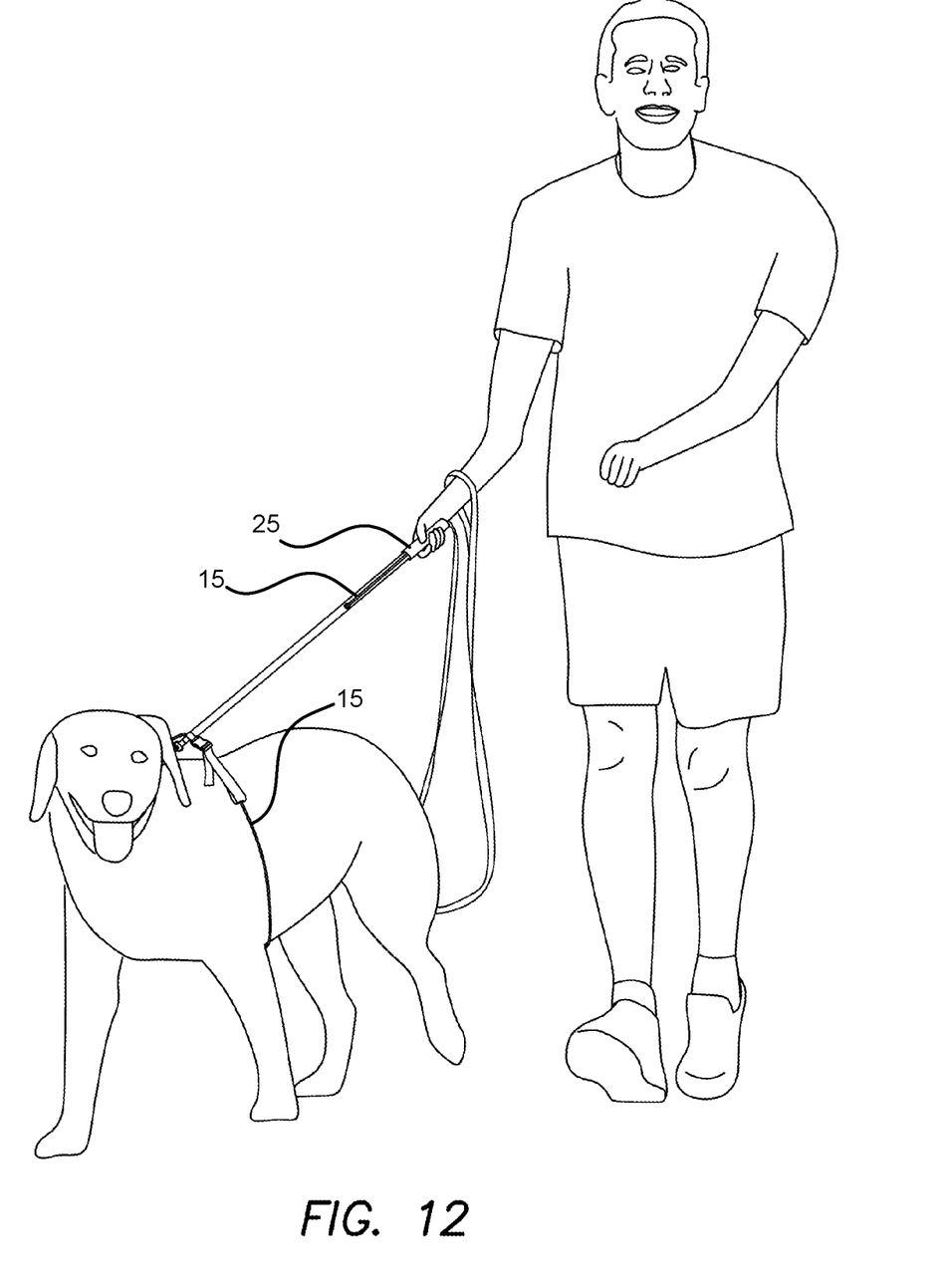
FIG. 12 is a perspective view of the two-leash pet restraint in operation.

A second internal tube 105, referring to FIGS. 1 and 9, is disposed inside the main leash under the entrance hole 30. The second internal tube is generally a hollow cylinder with a metal wedge piece 110 inserted therein, with the face of the wedge 110 facing a hole 115 in the side of the second internal tube 105. The hole 115 in the side of the second internal tube 105 is aligned with the entrance hole 30 of the main leash. The command leash inters through the entrance hole 30 and enters the hole in the second internal tube 115 and exits a lower end 120 of the second internal tube and enters the passageway 22. The interior of the second internal tube leads the passageway 22 similar to first internal tube 40. Optionally, the first and second internal tubes 40, 105 may by replaced with an external tube, where the tubes are disposed outside the main leash 20 and connected to the main leash 20.

In another variant, the main leash 20 comprises tubular webbing having paracord material stuffed within the webbing. A first end of the main leash 20 is attached to a handle 24 and a second end is attached to the swivel bolt hook 55. Optionally, the command leash 15 comprises a spectra cord, which is of a thinner dimension than the main leash 20 to elicit a stronger response from the dog when tightened around the dog. Optionally the command leash 15 is comprised of paracord. The command leash 15 is configured to wrap around the rib cage or upper abdomen of a dog.

The command leash 15 is configured to slide within the main leash 20 and is anchored to command leash handle 25. The command leash 15 has a smaller cross section than the main leash and is optionally non-stretch, high strength ⅛ inch diameter UEMWPE cord. The command leash handle 25 glides freely over the main leash 20 webbing, as the command leash handle 25 is configured as tube with an interior that the main leash 20 is disposed in and passes through. In a variant, the command leash has triangular configuration of holes 94 in a side, that permits the command leash to be attached and additional length of command leash line 15 may be stowed by winding it around the command leash handle 25. Optionally, a cover (see FIG. 1) may be placed over the command leash handle 25 to hide the wound command leash on the command leash handle 25 and provide for a better grip for the user. In a variant, referring to FIG. 4, the command leash 15 enters through the bottom into the tubular interior of the command leash handle and exits the top hole, and enters the left hole and exits the right hole. The command leash 15 is activated when a user holds the command leash handle 25, using the dog's momentum or by tugging on the handle. When the command leash handle is released, the handle is returned to its original position as the regular leash extends and the elastic relaxes. The elastic is attached to the buckle, making the buckle adjustable. The excess elastic webbing allows for slight adjustments of the restraint for both the dog and user.

In a further variant, the command leash 15 comprises beads 60 attached along the length of the command leash 15. The beads 60 increase the sensitivity of the command leash when activated. The beads 60 and the command leash 15 are configured to send communication signals to a pet. The command leash 15 is disposed inside the tubular webbing of the main leash 20 and then into a first end of the first internal tube 40. The length of the pipe 40 is based on the length of the restraint. In an optional variant, the pipe 40 has a mechanism that causes the command leash handle 25 to return to its original position after it is released by the owner. The placement of the holes 30 is configured to secure the command leash 15 in a position over the ribs or upper abdomen of a dog. The holes 30, 32 in the main leash 20 and the first internal tube 40 is dimensioned to allow easy back and forth movement of the command leash 15.

The command leash 15 continues out of the end 31 of the pipe away from the swivel bolt 55. It passes inside the tubular webbing 20 before emerging at the third of three holes 30 in the tubular webbing where it is attached to the front of a pex pipe or command leash handle 25 via a knot. In the present example embodiment, the command leash handle 25 is a pex pipe and is configured to allow the pex pipe to slide up and down the tubular webbing 20. A lip on the far end helps to make the little or index finger more effective on the grip. The three holes are configured to lower the handle. The larger the dog, the closer the three holes are disposed to the top of the leash. The three holes allow for fine tuning of the handle location for an owner.

In yet another variant, the leash is fully adjustable and one size fits any combination of dog and owner. This is achieved by a combination of using different holes in the main leash for the command leash 15, and length of cord and elastic. The command leash 15 is adjusted to fit the dog and the owner so that the dog is next to the user when the command leash 15 is in use. The cord, elastic, and webbing sizes vary to accommodate the different load capacities of pets.

What is claimed is:

1. A two-leash pet restraint, comprising:
    a main leash having a handle end and a collar connection end configured to be joined to a collar of a pet, the main leash having a passageway oriented along a handle to collar connection end direction of a main leash;
    a command leash partly disposed inside the passageway of the main leash and slidable within the main leash, the command leash having a first part disposed outside the main leash proximal to the collar connection end, and a second part disposed outside the main leash, closer to the handle end than the first part is; and
    a command leash handle disposed outside the main leash, closer to the handle end than the second part is, the command leash handle being joined to the second part of the command leash and being formed as a tube with an interior that the main leash is disposed in and passes through, such that the command leash handle is configured to glide over the main leash.

2. The two-leash pet restraint of claim 1, wherein the command leash has a smaller cross section than the main leash.

3. The two-leash pet restraint of claim 1, wherein the main leash further comprises an entrance hole leading to the passageway, and an exit hole leading from the passageway disposed proximal to the collar connection end;
    wherein the command leash enters the main leash through the entrance hole and exits the main leash through the exit hole; and
    wherein the entrance hole is closer to the handle end of the main leash than the exit hole is.

4. The two-leash pet restraint of claim 1, comprising a releasable connection mechanism configured to connect the first part of the command leash to the main leash.

5. The two-leash pet restraint of claim 1, wherein the connection mechanism has a male end and a female end, wherein one end is attached to the main leash and the other end is attached to the command leash and wherein the male and female ends are configured for releasably connecting to each other for installation of the command leash around the body of a pet.

6. The two-leash pet restraint of claim 5, wherein the connection mechanism comprises a strip that connects to the main leash at the exit hole and covers the exit hole with a hole in the strip that aligns with the exit hole for passage of the command leash.

7. The two-leash pet restraint of claim 5, comprising a strip joined to an end of the first part of the command leash and disposed between the end of the first part of the command leash and the other end of the connection mechanism.

8. The two-leash pet restraint of claim 7, wherein the strip comprises elastic material and/or webbing.

9. The two-leash pet restrain of claim 7, wherein a connection between the strip and the other end of the connection mechanism is adjustable, to adjust a length of the strip between the end of the first part of the command leash and the connection mechanism.

10. The two-leash pet restraint of claim 1, further comprising a hollow first internal tube disposed inside the passageway of the main leash at the exit hole, the first internal tube having a cutout to permit passage of the command leash therethrough; wherein the command leash is disposed through the first internal tube through an end of the first internal tube and a side of the first internal tube through a cutout in the first internal tube.

11. The two-leash pet restraint of claim 1, further comprising a hollow second internal tube, disposed inside the passageway of the main leash at the entrance hole, the second internal tube having a hole to permit passage of the command leash therethrough; wherein the command leash is disposed through the second internal tube through an end of the internal tube and a side of the second internal tube through a hole in the second internal tube.

12. The two-leash pet restraint of claim 1, wherein the main leash further comprises a plurality of entrance holes leading to the passageway, and an exit hole leading from the passageway and disposed in proximity of the collar connection end;

wherein the command leash enters the main leash through one of the entrance holes and exits the main leash through the exit hole;

wherein the plurality of entrance holes are closer to the handle end than the exit hole is.

13. The two-leash pet restraint of claim 1, wherein the second part of the command leash and the command leash handle are closer to the collar connection end than to the handle end of the main leash.

* * * * *